US005512942A

United States Patent [19]

Otsuki

[11] Patent Number: 5,512,942

[45] Date of Patent: Apr. 30, 1996

[54] ANOMALY SURVEILLANCE DEVICE

[75] Inventor: Akira Otsuki, Matsudo, Japan

[73] Assignees: Fujikura Ltd.; FMT Ltd., both of Tokyo, Japan

[21] Appl. No.: 135,618

[22] Filed: Oct. 14, 1993

[30] Foreign Application Priority Data

Oct. 29, 1992 [JP] Japan .................................... 4-291798

[51] Int. Cl.[6] ........................................ H04N 7/18

[52] U.S. Cl. ........................................ 348/143; 348/152

[58] Field of Search .................................. 348/143, 149, 348/152, 155, 162, 164, 169, 148, 154, 157, 159–162; 358/335, 342; H04N 7/18

[56] References Cited

U.S. PATENT DOCUMENTS

| | | | |
|---|---|---|---|
| 4,257,063 | 3/1981 | Loughry et al. | 348/155 |
| 4,614,968 | 9/1986 | Rattman et al. | 348/152 |
| 4,772,945 | 9/1988 | Tagawa et al. | 348/155 |
| 4,876,597 | 10/1989 | Roy et al. | 348/143 |
| 4,951,147 | 8/1990 | Aknar et al. | 348/143 |
| 5,099,324 | 3/1992 | Abe | 348/155 |
| 5,133,605 | 7/1992 | Nakamura | 348/164 |
| 5,144,661 | 9/1992 | Shamosh et al. | 348/143 |
| 5,150,426 | 9/1992 | Banh et al. | 348/155 |
| 5,151,945 | 9/1992 | Lee et al. | 348/155 |
| 5,153,722 | 10/1992 | Goedeke et al. | 348/159 |
| 5,194,908 | 3/1993 | Lougheed et al. | 356/28 |
| 5,243,418 | 9/1993 | Kuno et al. | 348/155 |
| 5,251,027 | 10/1993 | Labeau | 358/335 |
| 5,313,295 | 5/1994 | Taniguchi et al. | 348/143 |
| 5,359,427 | 10/1994 | Sato | 358/335 |
| 5,363,264 | 11/1994 | Cavanaugh et al. | 358/335 |
| 5,371,536 | 12/1994 | Yamaguchi | 348/143 |
| 5,396,283 | 3/1995 | Taniguchi et al. | 348/143 |

FOREIGN PATENT DOCUMENTS

| | | |
|---|---|---|
| 0261917 | 3/1988 | European Pat. Off. . |
| 2834079 | 10/1979 | Germany . |

*Primary Examiner*—Tommy P. Chin
*Assistant Examiner*—Vu Le
*Attorney, Agent, or Firm*—Oblon, Spivak, McClelland, Maier & Neustadt

[57] ABSTRACT

An image signal which is output by a video camera is segregated into image data S2 and synchronous data S3 by the synchronizing segregation circuit 1. At each frame, image data S2 is sequentially stored in the image data multilayer memory 8 which consists of frame memories formed in a ring shape. When an anomalous phenomena which includes this image data S2 is detected by the anomalous phenomena detecting device 2, then for image data S2 and anomalous image data S4, from a time immediately before the occurrence of an anomalous phenomena until the elapse of a prespecified period of time, maintenance and storage in the multilayer memory 8 for image data and in the multilayer memory 7 for extracted anomalous image data by the start/stop control circuit 6. Following this, the image data S2 and the anomalous image data S4 from immediately before the occurrence of an anomalous phenomena until the elapse of a prespecified period of time is forwarded to storage device 10 by the data transfer circuit 9. Based on the thus obtained images from before and after the occurrence of an anomalous phenomena, analysis and resolution of an anomalous phenomena occurring within a surveilled area may be carried out.

6 Claims, 3 Drawing Sheets

ANOMALY SURVEILLANCE DEVICE

BACKGROUND OF THE INVENTION

Field of the Invention

This invention relates to a surveillance device employed to detect the occurrence of an anomalous phenomena within a surveilled area and to record a picture image of the anomalous phenomena.

In facilities where non specified individuals enter and leave public areas (for example, banks, businesses, etc.), or where danger could arise due to the presence of a foreign object (for example, electric power plants, power transmission equipment), it has been the conventional practice to install video cameras at specific locations, and survey the area for the presence or absence of an anomalous occurrence by means of checking the picture images taken by the video cameras. In this type of surveillance, a method of real time surveillance involving a human monitor may be employed, or alternatively, the image of the surveilled area may be recorded on video tape and, by playing the video tape back after an anomalous event has occurred, the anomaly may be examined and resolved. It is noted here that the term "anomalous phenomena" as stated throughout this specification refers to an image which moves across the screen at a specific speed or undergoes changes (contrast) with respect to the still background image.

However, it is not generally possible to know when an anomalous phenomena will occur. Therefore, in conventional surveillance devices for detecting anomalous phenomena, when carrying out surveillance in real time, a person must be constantly employed at a monitor without regard, for example, to whether or not an anomalous event actually takes place. Thus, such monitoring to detect an anomalous phenomena, the occurrence of which cannot be predicted, cannot be regarded as very efficient.

Further, even in the case where not monitoring in real time, irrespective of the actual presence or absence of an anomalous phenomena, it is still necessary to constantly record the image of the surveilled area on video tape in order to capture an anomalous occurrence, the timing of which cannot be predicted. In this case, it is necessary to employ a method of using video tape capable long play recording or a method wherein intermittent recording is carried out.

Thus, as described above, with the conventional anomaly surveillance devices, the problem occurs in that it is not possible to carry out an efficient surveillance. Further, because it is not possible to specify when an anomalous event will occur, an additional drawback is present in the conventional devices in that, in the worst case scenario, the anomalous occurrence may be missed.

SUMMARY OF THE INVENTION

The present invention was conceived in light of the aforementioned circumstances, and has as its objective the provision of an anomaly surveillance device which is capable of recording only the images before and after the occurrence of an anomalous phenomena within an area under surveillance and with which the analysis of the anomaly can be easily accomplished.

In order to resolve the aforementioned problems, the invention of claim 1 is provided with:

shooting means for shooting the surveillance area and outputting the shot image as image data;

anomalous phenomena detecting means for detecting an anomalous image from said image data output by said shooting means and outputting the anomalous image as the anomalous image data;

recording interval setting means for setting the recording interval for said image data output by said shooting means;

segment setting means for setting the number of frames;

cycling address generating means for generating a cycling address in accordance with the number of frames;

anomalous image recording means consisting of a primary frame memory for the number of frames set by said segment setting means, said anomalous image recording means sequentially recording the anomalous image data output by said anomalous phenomena detection means in the frame memory indicated by said cycling address from among said primary frame memories, at each recording interval which is set by said recording interval setting means;

image storing means consisting of a secondary frame memory for the number of frames set by said segment setting means, said image storing means sequentially storing the image data output by said shooting means in the frame memory indicated by said cycling address from among said secondary frame memories, at each recording interval set by the recording interval setting means; and control means wherein the number of valid frames with respect to the number of frames set by the segment setting means is set, said control means controlling the initiation and termination of the storing of anomalous image data by said anomalous image data storing means, and the initiation and termination of the storing of image data by said image storing means, in accordance with the number of valid frames, when an anomalous image is detected by said anomalous image detection means.

In the present invention, an image of the surveillance area shot by the shooting means is supplied as prescribed image data to the anomalous phenomena detecting means. The anomalous image is detected from the image data by the anomalous phenomena detecting means, and, at each uptake interval which is set by the recording interval setting means, the anomalous image data is sequentially stored the frame memory which is indicated by a cycling address from among the primary frame memories which make up the anomalous image storing means. Further, at each uptake interval which is set by the recording interval setting means, the image data output by the shooting means is sequentially stored in the frame memory which is indicated by a cycling address from among the secondary frame memories which make up the image storing means. In this state, when an anomalous image is detected by the anomalous phenomena detecting means, the initiation and termination of the storing of anomalous image data by the anomalous image storing means, and the initiation and termination of the storing of image data by the image storing means, are controlled in response to the number of valid frames by the control means wherein there is set the number of valid frames of the frame memories set by the segment setting means.

DETAILED DESCRIPTION OF THE PREFERRED EMBODIMENTS

An explanation will now be made of the present invention with reference being made to the figures.

Figure 1:
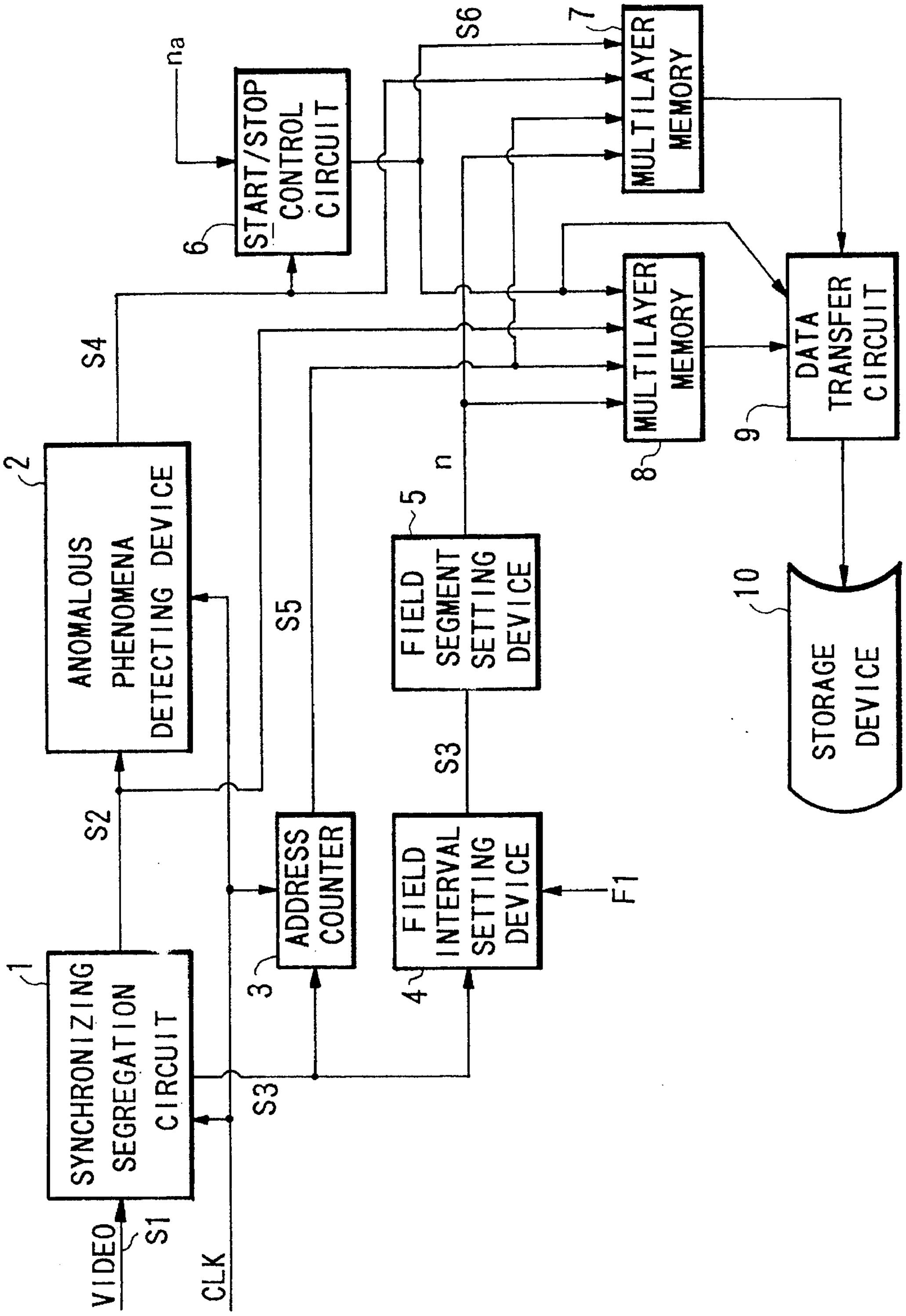
FIG. 1 is a block diagram showing the structure of an embodiment of the present invention.

FIG. 1 is a block diagram showing the structure of an embodiment of the present invention. In this figure, a synchronizing segregation circuit 1 segregates a video signal S1 which is supplied from a video camera (not pictured in the figure) into an image signal and a synchronizing signal according to a prespecified clock CLK. Following this, the image signal and the synchronizing signal are digitalized and image data S2 is supplied to the anomalous phenomena detecting device 2, while, synchronizing data S3 is supplied to the address counter 3 and the field interval setting device 4. From the image data S2, the anomalous phenomena detecting device 2, detects anomalous image data S4 corresponding to the anomalous phenomena (moving object, contrast changes, etc.) within the surveillance area, and supplies this to the start/stop control circuit 6 and the multilayer memory 7 for the extracted anomalous image.

Next, in accordance with the clock CLK and the aforementioned synchronizing data S3, address counter 3 generates address data S5, and supplies this to the multilayer memory 8 for the image data. Further, a recording interval FI for the anomalous image data S4 is set in the field interval setting device 4. In accordance with this recording interval FI, the synchronizing data S3 is supplied to the field segment setting device 5. For example, in the case of the interlace method, a single frame image can be obtained in 1/30th of a second, however, using the recording interval FI, setting is possible so that recording is performed by an interval which is an integral multiple of 1/30th of a second. Field segment setting device 5 consists of a ring counter, and the number of segments n of the ring counter is set as the number of frame memories which record the anomalous image data. In other words, field segment setting device 5 outputs a cycling value which varies as 1, 2, . . . ,n, 1, 2, . . . ,n wherein n represents a maximum value, to the multilayer memory 7 for the extracted anomalous image and to the multilayer memory 8 for the image data.

Next, the number of valid segments na (number of valid frames) with respect to the number of segments n described above is set in the start/stop control circuit 6. When anomalous image data S4 is supplied, the start signal S6 which is to indicate the start of recording is set at a high level and, following a time elapse in response to the number of valid segments na, the start signal S6 is set to a low level. The start signal S6 is supplied to the multilayer memory 7 for the extracted anomalous image and to the multilayer memory 8 for image data.

Multilayer memory 7 for the extracted anomalous image consists of a plurality of frame memories, and is designed to sequentially store anomalous image data S4 in the frame memories which correspond to the number of segments n, in accordance with address data S5. Further, similar to multilayer memory 7 for the extracted anomalous image, multilayer memory 8 for image data consists of a plurality of frame memories, and is designed to sequentially store image data S2, which includes anomalous image data, in a number of frame memories corresponding to the number of segments n, in accordance with address data S5. Further, at the point in time when the aforementioned start signal S6 changes from a high level to a low level, data forwarding circuit 9 forwards anomalous image data S4 of the multilayer memory 7 of the extracted anomalous image, and image data S2 of the multilayer memory 8 for the image data, to a prespecified storage device 10.

Next, with reference being made to FIGS. 2 and 3, the structures of the multilayer memory 7 for the extracted anomalous image and the multilayer memory 8 for the image data will now be explained in detail.

Figure 2:
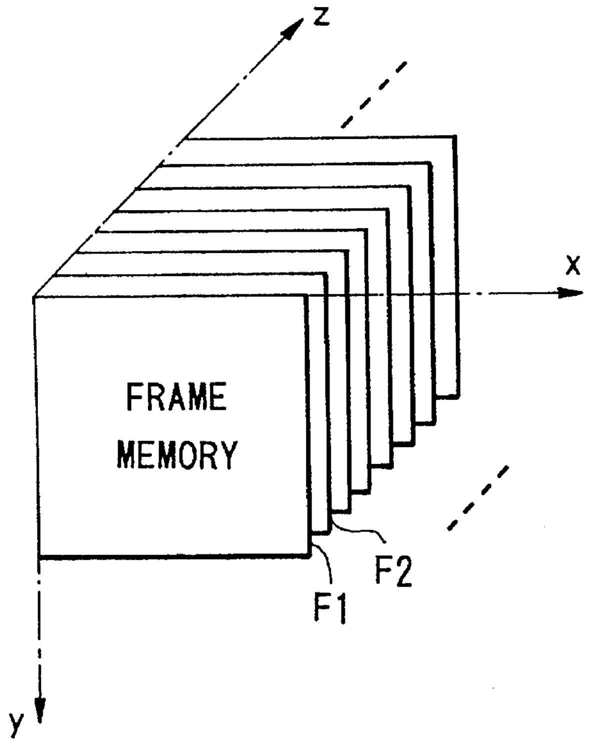
FIG. 2 is a block diagram showing one structure of the multilayer memory 7 for the extracted anomalous image of the same embodiment.

FIG. 2 is a block diagram showing one structure of the multilayer memory 7 for the extracted anomalous image. Because multilayer memory 8 for the image data has the same structure as that shown in FIG. 2, a diagram thereof is omitted here. As stated above, multilayer memory 7 for the extracted anomalous image consists of a plurality of frame memories F1, F2, . . . The aforementioned address data S5 specifies the address for the x direction and the y direction for one of the frame memories. Further, the number of segments n output by field segment setting device 5 is the data for specifying the z direction, i.e., the frame memory in which to store, for the plurality of frame memories shown in FIG. 2.

Figure 3:
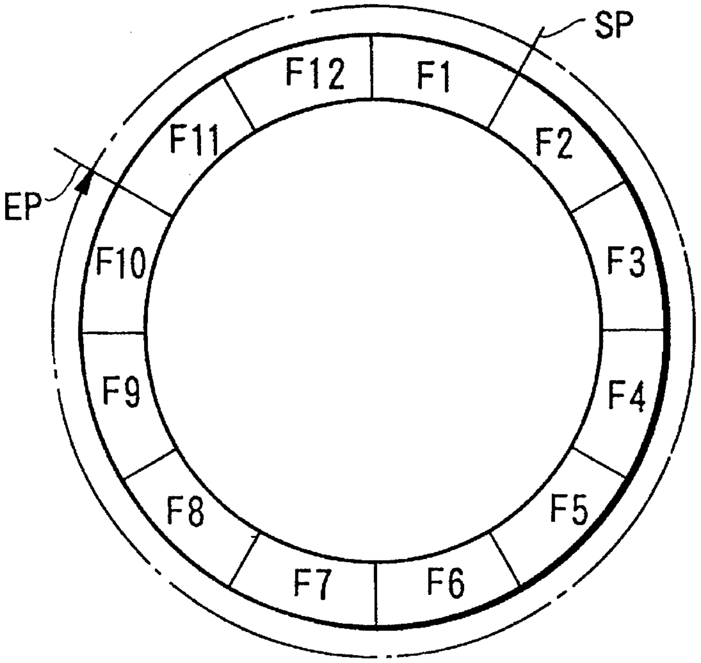
FIG. 3 is a block diagram showing the structure of the multilayer memory 7 for the extracted anomalous image of the same embodiment, as seen along the direction indicated by z.

Next, FIG. 3 is a block diagram showing the structure along the z direction of the multilayer memory 7 for the extracted anomalous image. In this figure, an address corresponding to the number of segments n is set so that the frame memories F1, F2, . . . , form a ring in the direction z as indicated. For example, if the number of segments n is 12, then, in accordance with the number of segments n, 12 frame memories F1 through F12 undergo sequential addressing, such that F1, F2, . . . , F12, F1, F2, . . . . To restate, one of the frame memories is renewed each 12th access. Further, in the figure, the point in time when the start signal S6 reaches a high level is indicated by the start point SP, and the point in time when the start signal S6 reaches a low level is indicated by the stop point EP. Additionally, the setting of the interval between the start point SP and the stop point EP according to the number of valid segments na is as described above. For example, in the multilayer memory 7 for the extracted anomalous image, as is shown in FIG. 3, if the start point SP and the stop point EP are determined, the image prior to the occurrence of the anomoly can be obtained in frame memories F11, F12, and F1. In reality, because this is prior to the occurrence of the anomoly, no image has been stored. Further, the anomalous image is obtained in frame memories F2, F3, . . . F10. On the other hand, with respect to multilayer memory 8 for the image data, a background image in which the anomoly does not appear is obtained in frame memories F11, F12, and F1, while in frame memories F2 through F10, the anomalous image is obtained along with the background image.

Additionally, the aforementioned recording interval FI, the number of frames n and the number of valid frames na are set in accordance with the changing speed of the anomalous phenomena in the surveillance area. For example, for a high speed anomalous event which occurs over a short period of time, the recording internal FI is set small, and the number of frames n and the number of valid frames na are set large. On the other hand, for a low speed anomalous event which takes place over a long period of time, the recording internal FI is set large, and the number of frames n and the number of valid frames na are set small.

Figure 4:
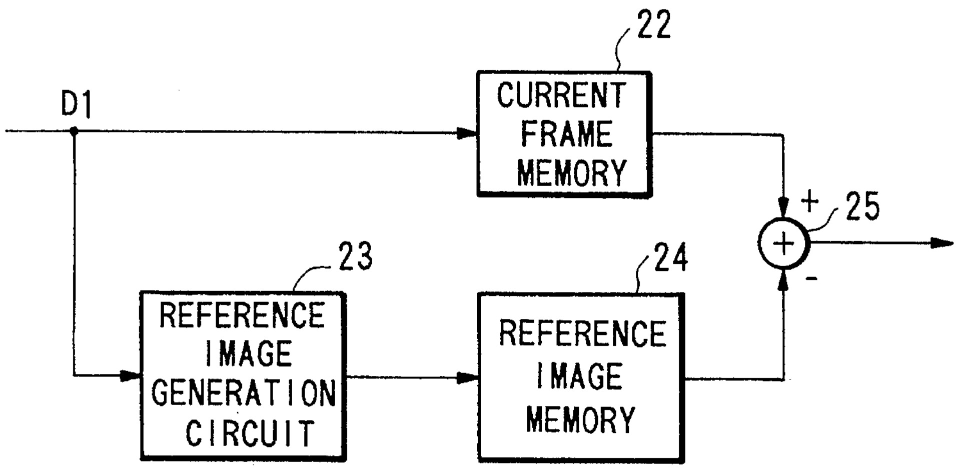
FIG. 4 is a block diagram showing the structure of the anomalous phenomena detecting device 2 according to the present embodiment.

With reference being made to FIG. 4, an explanation will now be made of the detailed structure of the anomalous phenomena detecting device 2 and the action thereof.

Figure 5:
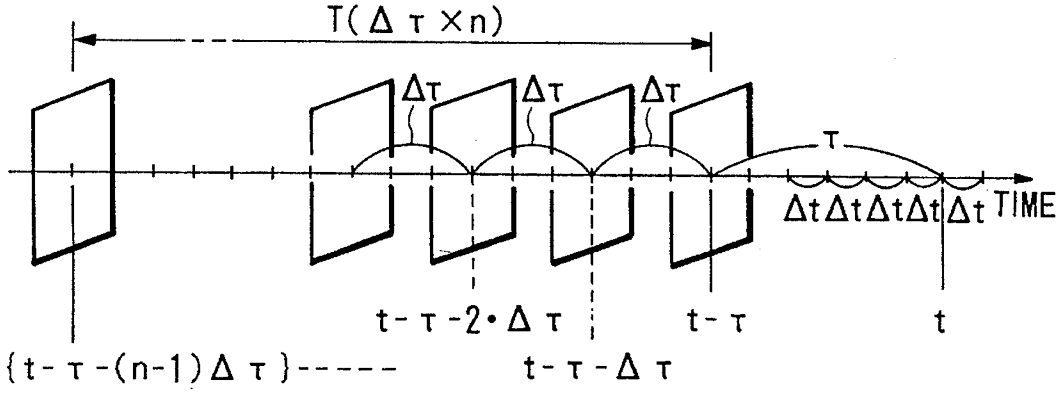
FIG. 5 is a conceptual diagram explaining the method of detection of an anomalous occurrence in an image.

FIG. 4 is a block diagram showing the structure of the anomalous phenomena detecting device 2 of an embodiment of the present invention. FIG. 5 is a conceptual diagram explaining the method of detection of an anomoly in an image. To begin with, in FIG. 4, the anomalous phenomena detection device 2 consists of a current frame memory 22, a reference image generation circuit 23, a reference image memory 24, and a subtracter 25. The current frame memory 22 is a storing device for storing the image data (one frame) at the current point in time. The image data S2 output by the synchronous segregating circuit 1 is stored in the current frame memory 22 at each time Δt shown in FIG. 5 while being output to subtracter 25 at each time Δt. Further, similar to the current frame memory 22, the image data output by the A/D convertor is sequentially supplied at each time Δt to the reference image generation circuit 23. This reference image generation circuit 23 generates the reference image S obtained by averaging n screens at each time Δτ (Δτ≧Δt) in the passing of a time τ only with respect to the time instant t. This reference image S is the image of only the background (static object) excluding the anomalous image from the image captured by the video camera. This reference image S becomes the standard used when detecting the anomalous image. An explanation will now be made of the generation of the reference image S and the extraction of the anomalous image.

First, a screen matrix comprising a i-dot×j-dot matrix of the screen at time instant t is expressed by $D_{ij}$ ($d_{ij,t}$). Further, the matrix of the desired reference image S is set to $S_{ij}$ ($S_{ij,t}$). On the other hand, the n number of screens after the elapse of time τ can be expressed by $D_{ij}$(t−τ), $D_{ij}$(t−τ−Δτ), $D_{ij}$(t−τ−2·Δτ), . . . $D_{ij}${t−τ−(n−1)Δτ}. Next the average matrix $D_{ij}(d_{ij})$ of these n data matrices is obtained, at each pixel:

$$d_{ij} = \frac{\sum^{n} d_{ij}}{n}$$

This average matrix $D_{ij}(d_{ij})$ has the characteristic in that the object, for which the image thereof changes, is masked during the time (n−1)Δτ. In other words, if there is no change between each screen (hereinafter referred to as "frame"), the frames are averaged as is, to become an average value at that point in time. On the other hand, when there is some sort of change, because the image in each frame changes, the change is averaged and masked. Further, because averaging takes place when there is some kind of momentary change as well, the change is masked by the background.

Accordingly, the final average matrix $D_{ij}(d_{ij})$ becomes only the background image which has changed within the line of view of the video camera during at least the time from time instant [t−τ−(n−1)Δτ] to time instant (t−τ), the image being excluded from this background image. In other words, the present invention is characterized in that only the background image is set as the reference image S. Accordingly, the matrix $S_{ij}$ ($S_{ij,t}$) of the reference image S becomes:

$$S_{ij}(s_{ij},t) = (1/n) \sum^{n} D_{ij}\{t - \tau - (n-1)\Delta\tau\}$$

It is noted here that the time τ may be set to [0] as well. In this case, the reference image S is generated based on the time elapse from time instant t to time instant {t−(n−1)Δτ}.

In this manner, the reference image S which was generated by the reference image generation circuit 23 is stored in the reference image memory 24 at each time Δτ. Reference image memory 24 stores the reference image S while at the same time the reference image S is output to the subtracter 25 at each time Δτ which is an integral multiple of the time Δt. Subtracter 25 subtracts the reference image S from the image data output by the current frame memory 22 at each time Δτ. Because the reference image S is the background image in the line of view of the video camera, the subtraction result of the subtracter 25 becomes the image from which the background has been excluded from the total image at that point in time. In other words, subtraction circuit 25 outputs only the anomalous image data S4 of the some kind of change (anomoly) at that point in time. The anomalous image data S4 is supplied to the start/stop control circuit 6 and the multilayer memory 7 for the extracted anomalous image.

Next, an explanation will be made of the operation of an embodiment of the present invention according to the above described structure.

First, as an initial setting, the recording interval FI is set to 1/60 sec, the number of segments n is set to 12 and the number of valid segments na is set to 8, for example. In other words, according to these initial settings, 12 frame memories are prepared for the multilayer memory 7 for the extracted anomalous image and the multilayer memory 8 for the image data respectively. At each 1/60th of a second, image data is sequentially recorded in each frame memory of multilayer memory 7 and 8. When some kind of anomoly occurs within the surveilled area, the anomalous image is stored in eight frame memories. It is noted here that for the purposes of this explanation, the surveillance area is taken to be the area surrounding a steel tower for high voltage power transmission lines. Following this initial setting, the video signal S1 of the view shot by the video camera is segregated into an image signal and a synchronous signal by the synchronous segregation circuit 1, and then these signals are converted into digital data. The image data S2 is sequentially stored in the multilayer memory 8 for the image data which consists of 12 frame memories, in accordance with the address data S5 which is output by the address counter 3. On the other hand, the anomalous phenomena detection device 2 detects the presence or absence of an anomoly within the image data S2. When there is no anomoly appearing within the supervised area, because the anomalous image data S4 output by the anomalous phenomena detection device 2 is at a low level, the start/stop control circuit 6 is not operated, and further, an image which can be confirmed in multilayer memory 7 of the extracted anomalous image is not recorded.

In the above operation, when there is cloud-to-ground discharge at a high voltage electric transmission tower, i.e. the supervised area, anomalous phenomena detection device 2 detects the flash caused by the cloud-to-ground discharge as an anomalous phenomena. The flash is supplied to the start/stop control circuit 6 as anomalous image data S4, and at the same time is supplied to multilayer memory 7 for the extracted anomalous image. In this example, assuming that the structure of the multilayer memory 7 of the extracted anomalous image is the same as that shown in FIG. 3, the anomalous image data S4 is stored sequentially in frame memories F2, F3, . . . from the start point SP. Then, when the stored frames reach the number of valid segments na, the start/stop control circuit 6 sets the start signal S6 to a low level. In other words, at the stop point EP shown in FIG. 2, image recording is completed. When the start signal S6 goes from a high level to a low level, the anomalous image data S4 in the multilayer memory 7 for the extracted anomalous image, and the image data S2 in the multilayer memory 8 for the image data are transferred to a prespecified storage device 10 by the data transfer circuit 9. During transfer, the data in neither of the multilayer memories is renewed. Then, when the transfer of anomalous image data S4 and image data S2 is completed, recording by multilayer memory 7 for the extracted anomalous image and by multilayer memory 8 for the image data is restarts.

For image data S2 and the anomalous image data S4, which were transferred by the storing device, only the phenomena occurring within a prespecified period of time (depending on the number of valid segments na) which starts from before the occurrence of an anomalous phenomena are recorded. Additionally, it is possible to obtain separately a background image which includes the anomalous phenomena and an image of the anomalous phenomena only. For these reasons, analysis and resolution of the occurrence of an anomalous event may be easily carried out.

Additionally, while in the preceding embodiments both multilayer memories have the structure shown in FIG. 2 or FIG. 3, they are not limited thereto. The structure shown in the Figures may also be made as one block and then a plurality of these blocks may be provided. Further, provided that the device is designed such that, at each occurrence of an anomalous phenomena, there is a changeover between blocks, an advantage wherein even a continuously occurring anomalous phenomena can be sufficiently followed may be obtained.

Further, in the above embodiments, an example was made of the case where the anomalous phenomena to be detected is one such as a cloud-to-ground electrical discharge. However, the present invention is in no way intended to be limited thereto, but may also be suitably applied to monitoring lava flows at the site of a volcanic eruption, the surveillance of individuals entering and leaving a dangerous facility, or the observation of the traffic flow at a traffic facility, for example.

Further, as long as it possesses dark and light contrast with respect to the background, the object which constitutes the moving object which is to be detected by the present invention is not limited with respect to the type of material or physical properties thereof.

Still further, the above described video camera is not necessary limited to one responsive to visible light rays only, but may instead be one responsive to invisible light (UV, infrared, etc.), X-rays, or laser beams.

We claim:

1. An anomaly surveillance device comprising:

camera means for photographing a surveillance area and outputting a shot image as image data;

anomalous phenomena detecting means, connected to said camera means, for detecting an anomalous image from said image data output by said camera means and outputting said anomalous image as anomalous image data;

recording interval setting means, connected to said camera means, for setting a recording interval for said image data output by said camera means;

segment setting means, connected to said recording interval setting means, for setting a number of frames in which said image data output by said camera means and said anomalous image data output by said anomalous phenomena detecting means are to be recorded;

cycling address generating means, connected to said camera means and anomalous phenomena detecting means, for generating a cycling address in accordance with said number of frames selected by said segment setting means;

anomalous image recording means, connected to receive said anomalous image data output by said anomalous phenomena detecting means, consisting of primary frame memories for storing said number of frames set by said segment setting means, said anomalous image recording means sequentially recording said anomalous image data output by said anomalous phenomena detecting means in a frame memory indicated by said cycling address from among said primary frame memories, at each recording interval which is set by said recording interval setting means;

image storing means, connected to receive said image data output by said camera means, consisting of secondary frame memories storing said number of frames set by said segment setting means, said image storing means sequentially storing said image data output by camera means in a frame memory indicated by said cycling address from among said secondary frame memories, at each recording interval set by said recording interval setting means; and control means for setting a number of valid frames of said primary frame memories in which said anomalous image data is to be recorded, with respect to said number of frames set by said segment setting means, said control means controlling an initiation and termination of storing of said anomalous image data by said anomalous image data recording means, and initiation and termination of storing of image data by said image storing means, in accordance with said number of valid frames, when an anomalous image is detected by said anomalous image detecting means.

2. An anomaly surveillance device according to claim 1, wherein said anomalous phenomena detecting means comprises:

reference image generating means for inputting sequentially supplied images output by said camera means at pre-specified time intervals and generating a reference image by averaging the inputted images; and subtracting means for subtracting the reference image from the image output by said camera means.

3. An anomaly surveillance device according to claim 1, wherein said recording interval, said number of frames, and said number of valid frames are set in accordance with a speed of movement of an anomalous phenomenon within said surveillance area such that said recording interval is set to be small and said number of frames and said number of valid frames are set to be large in accordance with a high speed anomalous phenomenon, while said recording interval is set to be large and said number of frames and said number of valid frames are set to be small in accordance with a low speed anomalous phenomenon.

4. An anomaly surveillance device according to claim 1, wherein said recording interval is an integer multiple of a time interval in which image data of one frame is output.

5. An anomaly surveillance device according to claim 1, wherein said anomalous image recording means and said image storing means comprise a plurality of frame memories, a number of which are set by said segment setting means and store image data.

6. An anomaly surveillance device according to claim 1, wherein said camera means is responsive to any one of visible light, invisible light, and laser beams of a specified wavelength.

* * * * *